(12) United States Patent
Prasad et al.

(10) Patent No.: US 8,271,953 B2
(45) Date of Patent: Sep. 18, 2012

(54) SYSTEM AND METHOD FOR PROVIDING MIDDLEWARE FOR CAPTURE OF GLOBAL REQUIREMENTS AND VALIDATION FOR WEB APPLICATIONS

(75) Inventors: Mukul R. Prasad, San Jose, CA (US); Indradeep Ghosh, San Jose, CA (US); Sreeranga P. Rajan, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 1225 days.

(21) Appl. No.: 12/046,736

(22) Filed: Mar. 12, 2008

(65) Prior Publication Data

US 2009/0235235 A1 Sep. 17, 2009

(51) Int. Cl.
G06F 9/44 (2006.01)
(52) U.S. Cl. ............... 717/126; 717/124; 717/131
(58) Field of Classification Search ............... None
See application file for complete search history.

(56) References Cited

U.S. PATENT DOCUMENTS

| | | | |
|---|---|---|---|
| 6,938,041 B1* | 8/2005 | Brandow et al. ............. 1/1 |
| 7,757,175 B2* | 7/2010 | Miller ............... 717/131 |
| 2006/0085681 A1* | 4/2006 | Feldstein et al. ............ 714/25 |
| 2006/0230432 A1* | 10/2006 | Lee et al. ............... 726/1 |
| 2006/0271844 A1* | 11/2006 | Suklikar et al. ............ 715/513 |
| 2008/0115112 A1* | 5/2008 | Sharma ............... 717/126 |
| 2009/0089757 A1* | 4/2009 | Rajan et al. ............ 717/124 |
| 2009/0089759 A1* | 4/2009 | Rajan et al. ............ 717/126 |
| 2009/0125976 A1* | 5/2009 | Wassermann et al. ....... 717/131 |
| 2010/0125832 A1* | 5/2010 | Prasad et al. ............ 717/124 |
| 2011/0225568 A1* | 9/2011 | Rajan et al. ............ 717/126 |
| 2012/0011489 A1* | 1/2012 | Murthy et al. ............ 717/126 |

OTHER PUBLICATIONS

Kubo et al., "Automatic Extraction and Verification of Page Transition in a Web Application", Dec. 4, 2007, IEEE, pp. 350-357 <http://ieeexplore.ieee.org/stamp/stamp.jsp?arnumber=04425874>.*

Dwyer et al., "Analyzing Interaction Orderings with Model Checking", 2004, IEEE, pp. 1-10 <http://www.computer.org/portal/web/csdl/abs/proceedings/ase/2004/2131/00/213101 54abs.htm>.*

Rajan et al., "Weave: WEb Applications Validation Environment", ICSE'09, May 16-24, 2009, IEEE <http://ieeexplore.ieee.org/xpls/abs_all.jsp?arnumber=5070968>.*

Tkachuk et al., "Environment generation for validating event-driven software using model checking", IET Softw., 2010, vol. 4, Iss. 3, pp. 194-209 <http://ieeexplore.ieee.org/xpls/abs_all.jsp?arnumber=5487640>.*

Rajan et al., "Software Applications Validation Environment: SAVE", Oct. 2007, Fujitsu Sci. Tech. J., 43,4, pp. 398-411 <http://www.fujitsu.com/downloads/MAG/vol43-4/paper04.pdf>.*

Castelluccia et al., "WAVer: A Model Checking-based Tool to Verify Web Application Design", 2006, Elsevier B.V., pp. 61-76 <http://

(Continued)

*Primary Examiner* — Thuy Dao
*Assistant Examiner* — Ben Wang
(74) *Attorney, Agent, or Firm* — Baker Botts L.L.P.

(57) ABSTRACT

In accordance with a particular embodiment of the present invention, a method is offered that includes supporting requirement validation middleware and capturing global requirements or properties for one or more web applications. A template-based formalism is employed to capture the requirements or properties. A small set of relevant temporal patterns are provided from which to choose in capturing the global requirements or properties. In specific embodiments, the method uses a set of pre-coded semi-configurable checkers. A Java-like syntax is used to specify expressions. A library of atomic entities or events (to compose expressions) is automatically generated. In still other embodiments, a small set of light-weight automatically-customizable checkers are employed in capturing the global requirements or properties. The method can be used with both formal and semi-formal techniques.

28 Claims, 6 Drawing Sheets

OTHER PUBLICATIONS www.sciencedirect.com/science/article/pii/
S1571066106002350>.*
Chen et al., "A Systematic Approach to Uncover Security Flaws in GUI Logic", May 20, 2007, IEEE, pp. 1-15 <http://ieeexplore.ieee.org/stamp/stamp.jsp?tp=&arnumber=4223215>.*
Tkachuk et al., "Automated environment generation for software model checking", Oct. 2003, IEEE, pp. 1-12 <http://ieeexplore.ieee.org/stamp/stamp.jsp?tp=&arnumber=1240300>.*
Flanagan et al., "Atomizer: A dynamic atomicity checker for multithreaded programs", 2004, ACM, pp. 256-267 <http://dl.acm.org/results.cfm?h=1&cfid=80530354&cftoken=50472730>.*
Ghosh et al., "Inventor Own Publication", Mar. 3, 2010, Fujitsu Laboratories of America, Sunnyvale, California, USA, pp. 1-6, <http://www.flacp.fujitsulabs.com/~ig/>.*

* cited by examiner

SYSTEM AND METHOD FOR PROVIDING MIDDLEWARE FOR CAPTURE OF GLOBAL REQUIREMENTS AND VALIDATION FOR WEB APPLICATIONS

TECHNICAL FIELD OF THE INVENTION

This invention relates generally to the field of web applications and, more specifically, to a system and a method for providing middleware for the capture of global requirements and validation for web applications.

BACKGROUND OF THE INVENTION

Typically a software application is validated through testing where a series of regression tests are run either manually or automatically after each modification of the software. Such testing techniques usually give poor functional coverage of the application under test and, further, may be time consuming. To address these issues, formal verification techniques have emerged as an alternative technology to validate software systems. Such verification tools try to mathematically prove the satisfiability of a specific requirement on a software application or obtain a counterexample in the form of a test case that breaks the requirement—thus, pointing to a bug.

A formal verification system used in software validation typically uses a model checker as its internal proof engine. The checker requires non-deterministic user inputs in the drivers that feed the application being checked. Further, the requirement to be validated is typically specified using a mathematical formalism known as temporal logic, which is difficult for non-formalists to grasp. This has proved to be a significant barrier in the adoption of model checking methods for validating software systems.

The ability to solve verification problems in web applications creates an interesting challenge. As with all such processing operations, of critical importance are issues relating to speed, accuracy, and automation.

SUMMARY OF THE INVENTION

The present invention provides middleware for the capture of global requirements and validation for web applications that substantially eliminates or reduces at least some of the disadvantages and problems associated with previous methods and systems.

In accordance with a particular embodiment of the present invention, a method is offered that includes supporting requirement validation middleware and capturing global requirements or properties for one or more web applications. A template-based formalism is employed to capture the requirements or properties. A small set of relevant temporal patterns are provided from which to choose in capturing the global requirements or properties.

In specific embodiments, a set of light-weight, pre-coded, automatically-configurable checkers are employed to capture the global requirements or properties. A JAVA-language-like syntax is used to specify expressions. A library of atomic entities or events [to compose expressions] is automatically generated. Such a method can be used with both formal and semi-formal techniques. The method uses a requirements entry UI that includes a requirements language and a library of requirement templates. In yet other embodiments, the requirements validation middleware is coupled to a software validation tool and a library of templatized property monitors. The requirements validation middleware could be part of a web-application validation toolkit.

There are several advantages to such an approach, such as: 1. offering simple formalism to specify global requirements of web applications; 2. automatically synthesized (by accompanying middleware) into a lightweight checker [i.e. no need to manually insert assertions in the code or manual code checkers or monitor on a per test case basis]; 3. the monitor is specifically designed to be lightweight (by being semi-customized to the property) and, hence, it efficiently executes and scales for large enterprise applications; and 4. can work in conjunction with a variety of formal and semi-formal validation tools.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
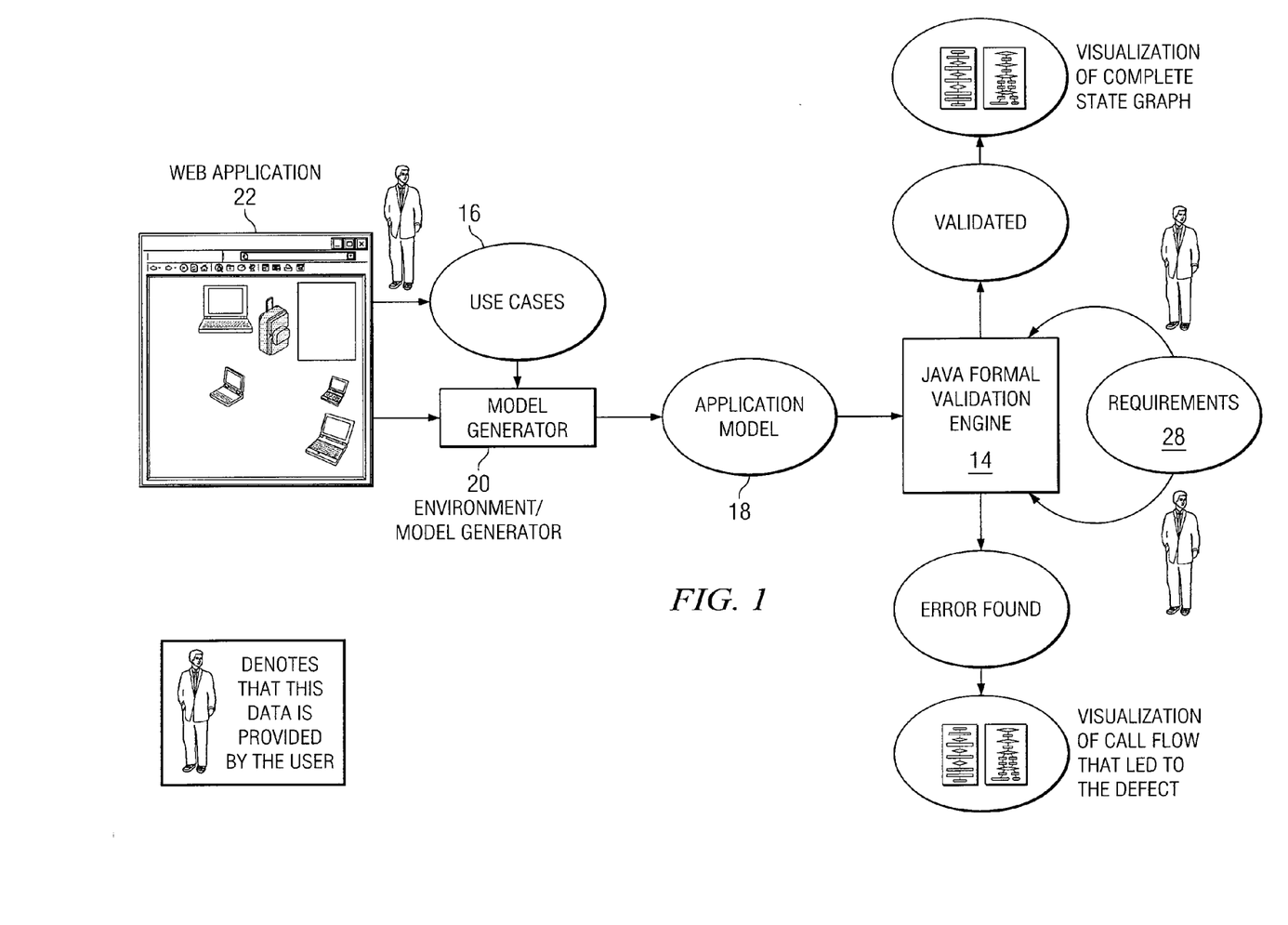
FIG. 1 is a simplified block diagram illustrating an example flow for formally validating a web application, in accordance with one embodiment of the present invention.

FIG. 1 is a simplified block diagram illustrating an example flow for formally validating a web application. FIG. 1 includes a JAVA validation engine (such as a JAVA model checker) 14, a set of use cases 16, an application 22, a model generator 20, an application model 18, a requirement/property specification tool 28 (abbreviated as 'Requirements' in FIG. 1.

The current mode of validating web applications, or for that matter any software, consists of testing techniques applied on manually written test-cases/monitors or assertions manually inserted into the application code. Formal validation techniques [if applied to such applications] offer the potential of more comprehensive coverage, as well as checking of more global system requirements. However, expressing requirements in formalisms appropriate for such techniques and writing or synthesizing checkers to actually check the requirements using the formal validation tool is a non-trivial task. Experience with using formal validation tools for hardware verification has shown that this can be a significant obstacle in the mainstream adoption of such tools.

The query becomes: How does the user specify requirements/properties that will hold on the application in an easy and correct way, and which tie that to the verification tool?

In accordance with the teachings of example embodiments of the present invention, the architecture presented herein includes a templatized formalism of global requirement capture, with software support, for web applications. The architecture supports middleware to efficiently validate requirements through a set of light-weight, automatically generated checkers.

Such an approach works because requirements capture the targeted information. Web application requirements can be global and have varied temporal character [e.g. an order cannot be placed without the user having logged in] and assertions or simple safety properties will not suffice. Most useful requirements can be captured by a small number (typically <10) temporal patterns. This is not true of all hardware/software application domains. Also the architecture uses a JAVA-language-like expression syntax for the most part. It can do a static analysis of the application code to build a repository of relevant atomic objects/events on which the requirement can be posed [e.g. button-clicks, screens, form-data on various fields, database tables and fields, etc.].

In terms of automatic monitor generation, there is not a dedicated algorithm like a temporal logic model checker. In fact the framework is not tied to a particular validation technique (e.g. a model checker) and temporal logic. Automatic monitor generation uses monitors/checkers and, as such, it can be fairly versatile (usable with a variety of formal and semi-formal validation techniques). It can also be quite efficient. There are no fully customized monitors for each property. In practice, it is too cumbersome to write or auto-synthesize such monitors. The solution outlined herein uses a set of pre-coded semi-configurable checkers.

In one non-limiting example scenario, the present invention facilitates using a new symbolic execution engine that is tuned to web applications and can be used to check for certain types of requirements/properties, which were not previously possible to identify.

Note that for purposes of teaching, the following explanation provides the audience with an overview for the proposed architecture. The idea presented herein, which offers middleware for requirements capture, is about capturing validation requirements and synthesizing monitors representing these requirements so that a downstream validation engine can conveniently and efficiently check them. Symbolic execution is one such engine and it is offered here as one potential example. Specifically, FIGS. 2-5 walk through this example implementation. That symbolic execution concept is about improving the symbolic execution based validation engine per-se: specifically, in the context of web applications. Thus, in a broad sense these two ideas (middleware and symbolic execution) represent two complementary parts of a common validation framework (e.g. the WEAVE framework). The elements of the symbolic execution concept are used here in the middleware concept as an aid to describing possible deployment scenarios of the technology.

Note that the current approach in industry involves testing using manual test-cases or monitors with code-assertions. This produces deficiencies such as being largely ad-hoc, manual and resource intensive, poor coverage [i.e. can miss corner-case bugs], and inferior assertions that only capture very local properties. Formal validation techniques for software include point tools such as model checkers for (pure) JAVA language but they are difficult to apply stand-alone and formalisms and usage is difficult to master for the average system engineer. There is no viable approach for customization for web applications.

Temporal logic, used in current paradigms, is a mathematical formalism to express properties/requirements. This is typically used for model checking of finite state concurrent/reactive systems. There are drawbacks to this approach; it is too complicated for use by the average system engineer and it presents a big barrier to the adoption of model checking.

Pattern-based requirement specification is proposed as a means of simplifying requirement capture but none proposed is used in the context of web applications or enterprise software. In addition, there is no system or solution for interfacing this with validation tools [other than using a full blown temporal logic model checker, which is not a very smart solution].

The proposed invention ties in with the methodology of the WEAVE tool, which attempts to apply a host of formal and semi-formal techniques to validate web applications. In this context, the invention enables the easy specification of global requirements and an automatic orchestration of the validation tool to check these requirements [through the provided middleware]. The invention uses the key observation that the vast majority of requirements for web applications are instances of a few simple temporal patterns. This is used to devise a formalism to specify requirements, which is simple enough for the average user. This formalism is coupled with an underlying middleware that can translate these requirements into a light-weight, automatically synthesized monitor that executes in conjunction with the validation engine to efficiently check the requirement.

There are several advantages to such an approach, such as: 1. offering simple formalism to specify global requirements of web applications; 2. automatically synthesized (by accompanying middleware) into a lightweight checker [i.e. no need to manually insert assertions in the code or manual code checkers or monitor on a per test case basis]; 3. the monitor is specifically designed to be lightweight (by being semi-customized to the property) and, hence, efficiently executes and scales for large enterprise applications; and 4. can work in conjunction with a variety of formal and semi-formal validation tools.

Figure 2:
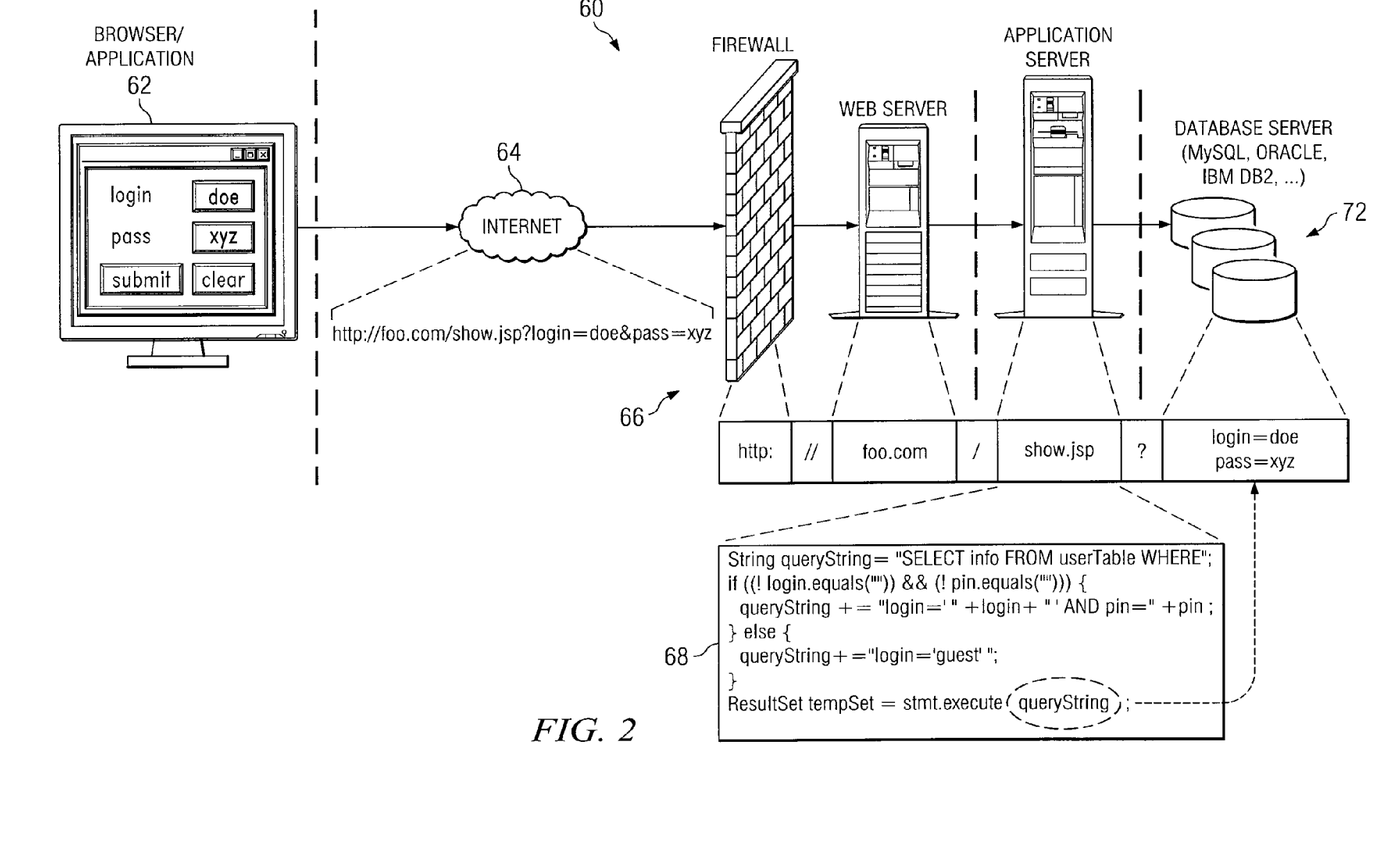
FIG. 2 is a simplified block diagram illustrating an example application scenario addressing symbolic execution in security validation.

FIG. 2 is a simplified block diagram illustrating an example application scenario addressing symbolic execution in security validation. FIG. 2 includes a vulnerable web application 60, a browser application 62, an Internet model 64, and a back-end component 66 that is connected to Internet 64. Within back-end component 66 is a firewall, a web server, an application server, and a database 72, which could be any suitable database object (such as MYSQL database, ORACLE database, IBM DB2 database, etc.).

Illustrated in FIG. 2 are some of the rough steps for achieving the teachings of the present invention. This represents a simple example in which there is a generic login [doe] and password [xyz].

FIG. 2 also includes a code segment 68, which is executed in this application as:

```
String queryString = "SELECT info FROM userTable WHERE ";
if    ((!  login.equals(""))    &&    (!pin.equals("")))
{queryString += "login='" + login + "' AND pin=" + pin ;}
else {queryString+="login='guest'";}
ResultSet tempSet = stmt.execute(queryString);
```

In a normal usage configuration, the user submits a generic login "doe" and a pin "123." [SELECT info FROM users WHERE login=doe AND pin=123.] In the case of malicious usage, an attacker submits '; SHUTDOWN;--' and pin of '0'. [SELECT info FROM users WHERE login=; SHUTDOWN;-- AND pin=0.] The response in this scenario is that the database shuts down. This illustrates a piggy-back, stored procedure attack. This is a type of security attack on the web application database by only using the web browser and is known as an SQL injection attack. Such malicious strings can be detected and, further, restricted from reaching the database by using the present invention. This is further detailed and discussed below.

Figure 3:
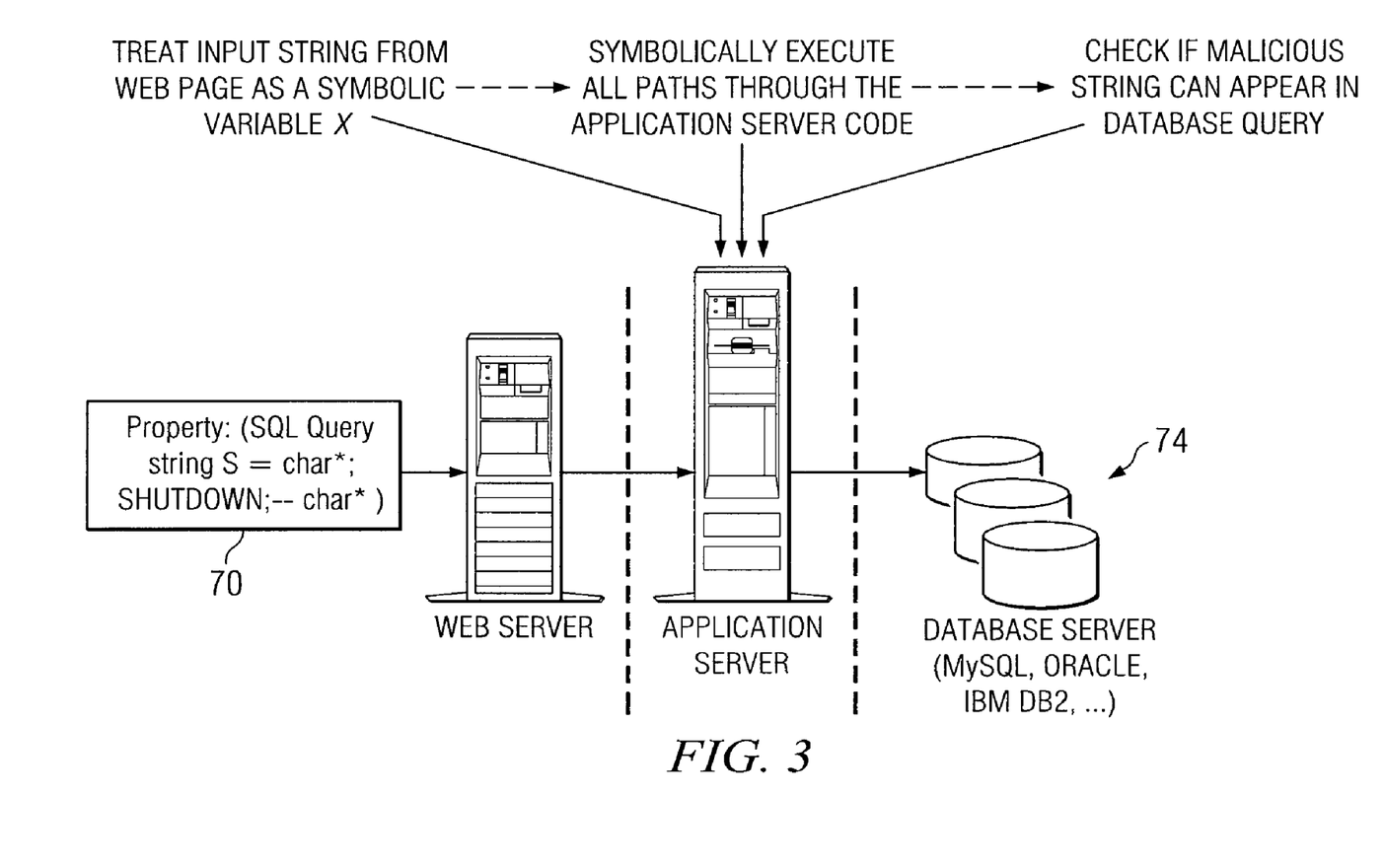
FIG. 3 is a simplified block diagram illustrating an example symbolic execution methodology in accordance with one embodiment of the present invention.

FIG. 3 is a simplified block diagram illustrating an example symbolic execution methodology in accordance with one embodiment of the present invention. FIG. 5 includes an error property component 70 and a component 74 that interfaces with that property component 70. In this example, component 74 includes a web server, an application server, and a database server.

As is demonstrated in FIG. 3, a symbolic string variable (X) is used to denote the login input. The error string is set as a query string, with some set of characters followed by ';SHUTDOWN;--' embedded in an arbitrary string, and then followed by additional characters. The symbolic execution operation is performed as specified in FIGS. 2 and 3 for the application server code in order to generate all possible strings, which could be possibly input into the database as a query at a particular hotspot in the program. Then, the FSM denoting the set of strings at the hotspot is intersected with the target malicious string FSM to identify a non-empty set if any. If it is so, then a way has been found to communicate a malicious string to the database. Hence, this type of symbolic execution of strings is an effective method to look for these types of security attacks.

Thus, a symbolic execution methodology and formal model checking techniques have been used to find security holes. There are several steps in the interaction of FIG. 3, which are formalized here. First, treat the input string from a webpage as a symbolic variable X. Second, symbolically execute all paths through the application server code and create symbolic path equations and FSMs representing sets of possible strings at the database query hotspot. Third, check if the malicious string, as specified in a requirement/property, can appear in the database query by intersecting the two FSMs and solving the path conditions through decision procedure solvers.

In this scenario, a person can check not only expected inputs, but also unexpected ones. This can be accomplished using a sophisticated symbolic string manipulation library. [e.g., "declare @a char(20) select @a=0x73687574646f776e exec(@a)"]. This represents HEX for 'SHUTDOWN'. The symbolic string manipulation libraries can automatically check for this variant of the malicious string.

In terms of advantages, the custom symbolic execution engine offers exhaustive checking over the input domain and over all feasible paths in the application program. There is no need for user inputs in drivers. In this case, unexpected behaviors/errors can be found. Moreover, the system is coupled with a GUI-based, intuitive user interface for specifying requirements/properties. The architecture can be customized and tuned for JAVA-language-based web applications. Thus, such an optimized architecture offers a symbolic execution tuned to web applications, which includes string manipulation algebra and applications for security validation. Such types of property checks that need to reason on the complete input space are not possible other than through this technology.

Figure 4:
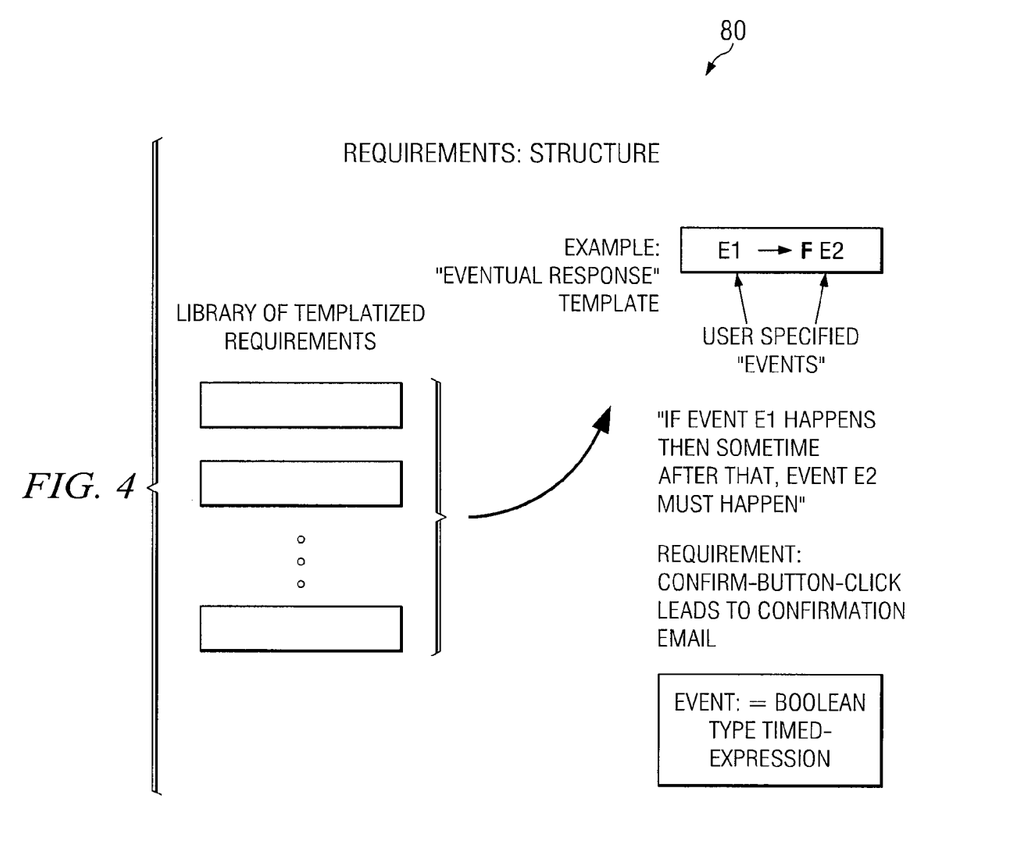
FIG. 4 is a simplified block diagram illustrating an example requirements structure.

FIG. 4 is a simplified block diagram illustrating an example requirements structure 80. Requirements structure 80 includes a library of templatized requirements along with User Specified Events. If event E1 happens then sometime after that, event E2 must happen. FIG. 4 also involves a timed-expression, which is a JAVA-language-like syntax: arithmetical-logical expression over fields/objects in the application program. Each field/object is annotated with a time-point relative to the execution of the program, which specifies the time-point at which the value of the field should be sample in order to evaluate the expression [e.g. ((a+b)@m1==c@m2)&((d<2)@m3), where a, b, c, d are fields in the program and m1, m2, m3 specify time-points during the program execution].

Figure 5:
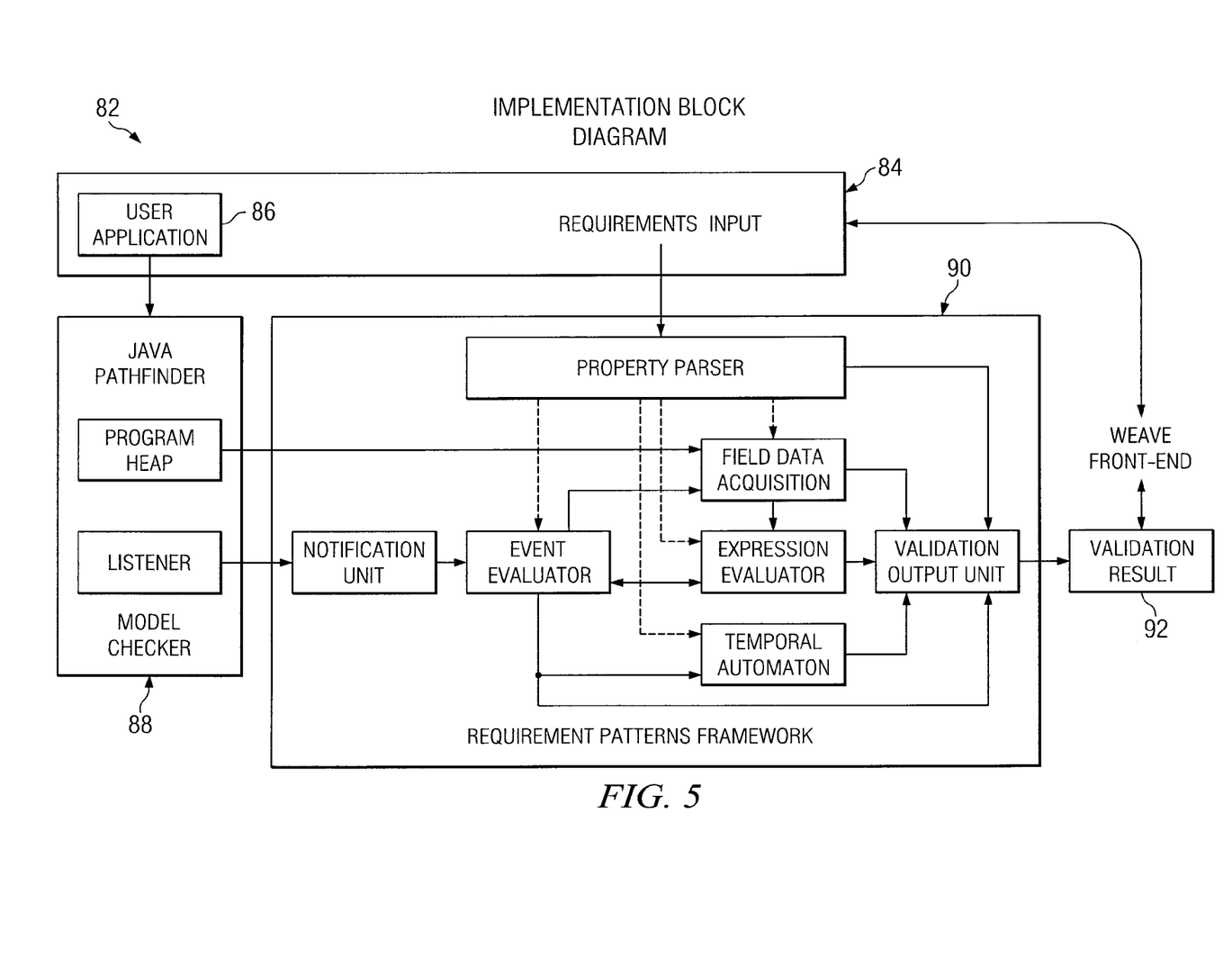
FIG. 5 is a simplified block diagram illustrating an example implementation block diagram.
Figure 6:
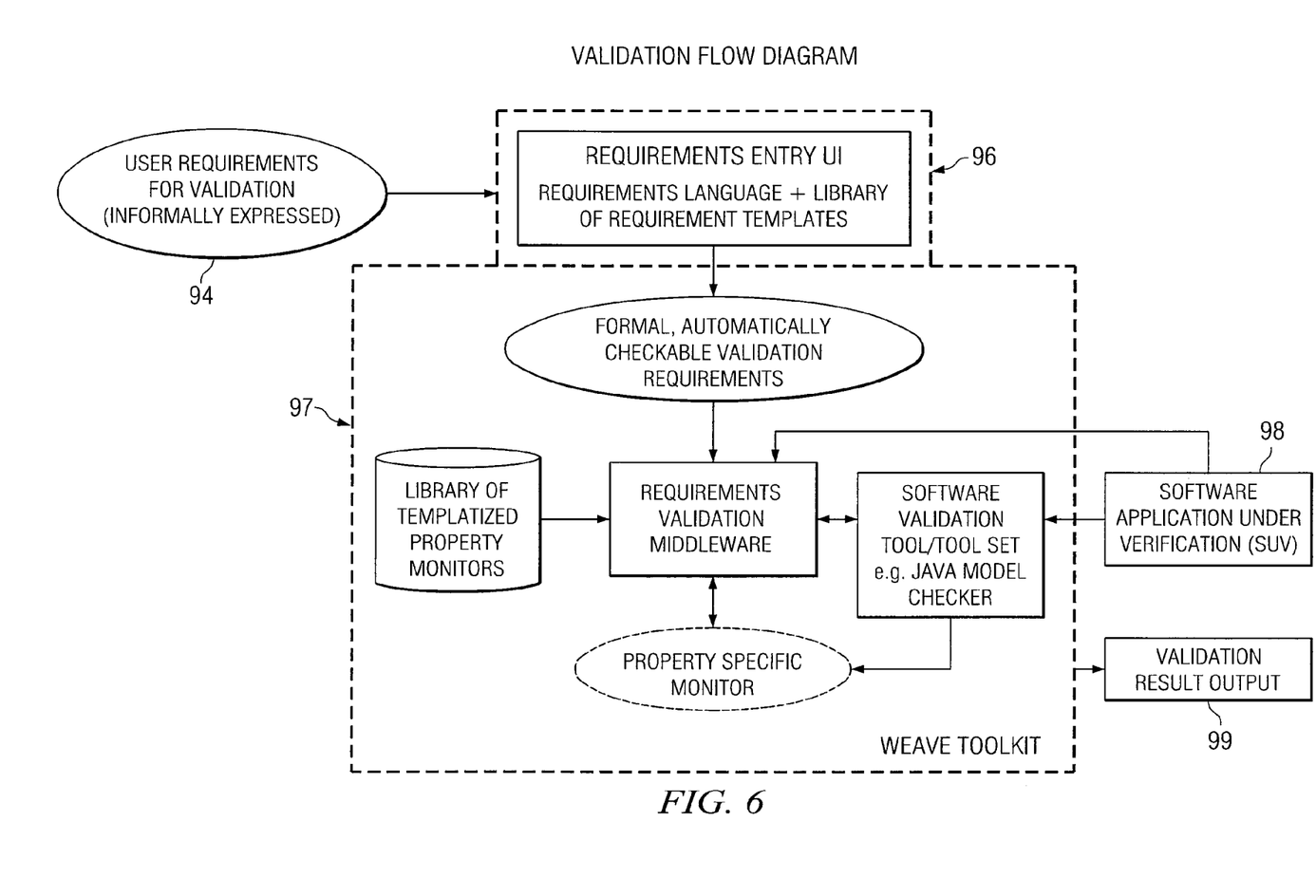
FIG. 6 is a simplified block diagram illustrating an example validation flow diagram.

FIG. 5 is a simplified block diagram illustrating an example implementation block diagram 82 that includes a requirement patterns framework 90, a validation result 92, a requirement input 84, and a model checker 88. FIG. 6 is a simplified block diagram illustrating an example validation flow diagram that includes a user requirement for validation element 94, a requirements entry 96, a WEAVE toolkit 97, a software application under verification (SUV) 98, and a validation result output 99.

In operation, a given user (which could be another computer or a human user) supplies software application to be verified (SUV). The user inputs requirements (properties) to be validated on the SUV using the requirements user interface (UI). The validation middleware coordinates the flow of data/events/information between the various modules. For each requirement, the validation middleware: generates a requirement specific monitor(s) using templatized monitors from the library, supplies suitable data and event information to the monitor from the SUV and the validation tools [from time to time during the verification process], and translates verification results provided by the monitor and/or verification tool(s) into suitable form and outputs it to the user.

Moving from this flow to the language syntax and semantics, the following discussion explains specifying requirements using property templates. For the property template structure, each requirement expressed in this requirements language is constructed by choosing one of the temporal templates listed below and concretely defining the events in the template as timed-expressions expressing desired data and control flow behavior of the software application under verification (SUV). Each template is essentially a temporal logic formula capturing a frequently occurring requirement pattern. Note that the list of templates provided below merely reflects one implementation of the WEAVE tool and can be added to or amended as needed.

The temporal operators are supported: G: Globally; X: By the next state; F: eventually or finally; P: Previously or before. More specifically, temporal templates are supported:

1. G(<E1>): Global safety <E1>: event:=Enforces that the event <~E1> never occurs during an execution trace
2. <E1>→F <E2>: Eventual response <E1>,<E2>: event:=Requires that if event E1 is seen during a trace, sometime later in the trace event E2 must happen.
3. <E1>→X <E2>: Immediate response <E1>,<E2>: event:=Requires that if event E1 is seen during a trace, event E2 must be observed after that and before the next state.
4. <E1>→P <E2>: Precedence <E1>,<E2>: event:=Requires that if event E1 is seen during a trace, sometime earlier in the trace event E2 must have happened.

In regards to the event:

Syntax:

event:=(Boolean) timed-expression

An event is essentially a timed-expression of Boolean type. In other words, it is a time-annotated, arithmetical-logical expression that evaluates to a single true or false value.

For a timed-expression:

```
Syntax:
    timed-expression  :=  field-expression @ method-call-
    event
              OR
    timed-expression  :=  timed-expression1 op2 timed-
    expression2
        where op2 is one of the following binary
    operators:
        Arithmetic: +, −, *, /,
        Relational: <, >, ==, ≥, ≤, ≠,
        Logical: &, |, →, ^
        Container Access: for all, [ ], { }
```

A timed-expression is an arithmetical-logical expression based on values of fields/objects in the software application under verification (SUV) and literal values (i.e. constants) connected using the operators listed above. Since the value(s) of a field/object typically changes during the course of execution of a program, each field/object used in the expression is annotated by a time-point (called method-call-events, defined below) relative to the execution of the SUV, which unambiguously specifies the precise value (or set of values) to be picked up in evaluating the expression.

A timed-expression may evaluate to a single value or a set of values (if it is a container object such as an array, hash map, or set that is being evaluated). Further the value(s) may be of a Boolean, String, numeric (i.e. floating-point or integer) type. For the field expression,

```
Syntax:
    field-expression  :=  field-expression1 op2 field-
    expression2
        where op2 is one of the following binary
    operators:
        Arithmetic: +, −, *, /,
        Relational: <, >, ==, ≥, ≤, ≠,
        Logical: ~, &, |, →, ^
        Container Access: for all, [ ], { }, .
              OR
    field-expression  :=  ~field-expression1
              OR
    field-expression  :=  field/object/literal
```

A field-expression is an untimed version of the timed-expression defined above. In its simplest form it can simply be a constant or a symbol referring to a field or object in the SUV. As such, a field-expression is simply a string of symbols connected by operators and parenthesis. In order to evaluate to a value(s) in the context of the execution of the SUV, it needs to be annotated with a method-call-event to produce a timed-expression.

In regards to the method-call-event, a method-call-event is a means of representing specific time-points in the execution trace of an application. It may be concrete enough to represent a single concrete time-point or abstract enough to match several. The precise syntax is as follows:

```
Syntax:
method-call-event:= <method_1>(<param_1> = <value_1>)<invoke/return>@
<method_2>(<param_2> = <value_2>)@ ... @<method_{k−1}>(<param_{k−1}> =
<value_{k−1}>)@<method_k>(<param_k> = <value_k>)
OR
method-call-event := weave-state
``` where:
<method_i>: Full-name of a valid JAVA language method called during the application execution
<param_i>: (Optional) Name of the parameter in the argument list of the method
<value_i>: (Optional) Actual value taken by the parameter referred to by <param_i> during the specific invocation(s) of <method_i> being referred to in this method-call-event
weave-state: This will produce a match at each WEAVE state (please see appendix for definition of WEAVE state).

For operator precedence and Input/Output types:
timed-expressions as well an field-expressions are evaluated left to right based on the operator precedence below (operators on the same line have equal precedence).

| Container/Object Access operators: | ., [ ], { } |
|---|---|
| Logical NOT: | ~ |
| Arithmetic Operators: | /, * |
| | +, − |
| Relational Operators: | <, >, ≥, ≤ |
| | ==, ≠ |
| Logical Operators: | & |
| | ^ (exclusive OR) |
| | \| |
| | → |
| Iterator (on containers): | for all |

The container and object access operators, namely the member access operator (.), indexed look-up operator [ ], hash look-up operator { } and the iterator, for all have a specialized syntax as follows:

1. . : <res>:=<e1>.<e2>, <e1> is an object reference and <e2> is a data member of <e1>, <res>: returns a reference to or value of member field <e2>
2. [ ]: <res>:=<e1>[<e2>], <e1>: An indexable container type such as arrays, array Lists etc., <e2>: int, <res>: the value stored at the index <e2> in the array <e1>)
3. { }: <res>:=<e1>{<e2>}<e1>: An content addressable container type such as a JAVA map, <e2>: String, <res>: the value stored against the key <e2> in the map <e1>)
4. for all( ): the following 3 variants are supported for this operator:
   a. for all(index, <container>) {<expression>}
   b. for all(key, <container>) {<expression>}
   c. for all(item, <container>) {<expression>}
   Syntax: <res>:=for all(index/key/item, <container>) {<expression>}
   <res>, <expression>: Boolean; <container>: any container class with an iterator suitably defined (in the WEAVE accessor library) e.g. map, array, list, array List; <index>: int; <key>: object, <item>: object.

The above syntax definitions refer to untimed entities as operands, but the syntax is identical for timed-expressions as well, where applicable. The remaining operators only operate on primitive types (numeric, String, Boolean) and evaluate to the same set of types as well, as below:
1. Arithmetic: <res>:=<e1>+, −, *, / <e2>, where <e1>, <e2>, <res>: numeric types
2. Relational: <res>:=<e1> <, >, ==, ≥, ≤, ≠ <e2>, where <e1>, <e2>: numeric or String types and <res>: Boolean
3. Logical: <res>:=<e1> &, |, →, ^ <e2> OR <res>:=~<e1>, where <e1>, <e2>, <res>: Boolean type.

In regards to the WEAVE state, while the requirements specification language defined above primarily uses an event-based formalism, the notion of WEAVE state is used to define a set of "points of interest" in execution traces of the application under verification. These state-points may then be used to enforce some abstract notion of time such as in the immediate response property template as anchors for defining interesting events in general (to be then used in properties).

Currently, WEAVE states are designed to correspond to a user-specified set of salient method-calls (e.g. relevant screen transitions in a web application). In the degenerate case WEAVE states can simply use the state points of the underlying model checker (JPF in one example case).

It is critical to note that the components illustrated in FIGS. 1-6 may be implemented as digital circuits, analog circuits, software, or any suitable combination of these elements. In addition, any of these illustrated components may include software and/or an algorithm to effectuate their features and/or applications as described herein. The software can execute code such that the functions outlined herein can be performed. Alternatively, such operations and techniques may be achieved by any suitable hardware, component, device, application specific integrated circuit (ASIC), additional software, field programmable gate array (FPGA), processor, erasable programmable ROM (EPROM), electrically erasable programmable ROM (EEPROM), or any other suitable object that is operable to facilitate such operations. Considerable flexibility is provided by the structure of these architectures in the context of this arrangement. Thus, it can be easily appreciated that such functions could be provided external to the outlined environment. In such cases, such a functionality could be readily embodied in a separate component, device, or module.

While the present invention has been described in detail with specific components being identified, various changes and modifications may be suggested to one skilled in the art and, further, it is intended that the present invention encompass any such changes and modifications as clearly falling within the scope of the appended claims.

Note also that, with respect to specific process flows disclosed, any steps discussed within the flows may be modified, augmented, or omitted without departing from the scope of the invention. Additionally, steps may be performed in any suitable order, or concurrently, without departing from the scope of the invention.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A computer-implement method, comprising:
   supporting requirement validation middleware;
   capturing requirements or properties for one or more web applications, wherein:
      template-based formalism is employed to capture one or more requirements or properties of the operation of the web applications; and
      the template-based formalism includes formal expression of the requirements or properties in relationship with the occurrence of events associated with the web applications; and
   providing a set of relevant temporal patterns from which to choose in capturing the requirements or properties, the set being a subset of the set of possible requirements or properties, the set of relevant temporal patterns used in conjunction with the template-based formalism for the formal expression of the requirements or properties in relationship with the occurrence of events associated with the web applications.

2. The method of claim 1, wherein the requirements validation middleware is part of a web application validation toolkit.

3. The method of claim 1, wherein requirements and properties are expressed using arithmetical-logical syntax.

4. The method of claim 1, wherein a library of atomic entities or events is automatically generated to compose expressions.

5. The method of claim 1, wherein a set of light-weight, pre-coded, automatically-configurable checkers are employed in capturing the requirements or properties, the set being a subset of the set of checkers for capturing all possible requirements or properties.

6. The method of claim 1, wherein the method is used with both formal and semi-formal techniques.

7. The method of claim 1, wherein the method can be used with model checking, symbolic execution, testing, or runtime checking.

8. The method of claim 1, wherein the method uses a requirements entry user interface (UI) that includes requirements language and a library of requirement templates.

9. The method of claim 1, wherein the requirements validation middleware is coupled to a software validation tool and a library of templatized property monitors.

10. Logic embedded in a non-transitory computer medium and operable to:
    support requirement validation middleware;
    capture requirements or properties for one or more web applications, wherein:
       template-based formalism is employed to capture one or more requirements or properties of the operation of the web applications; and
       the template-based formalism includes formal expression of the requirements or properties in relationship with the occurrence of events associated with the web applications; and
    provide a set of relevant temporal patterns from which to choose in capturing the requirements or properties, the set being a subset of the set of possible requirements or properties, the set of relevant temporal patterns used in conjunction with the template-based formalism for the formal expression of the requirements or properties in relationship with the occurrence of events associated with the web applications.

11. The logic of claim 10, wherein requirements and properties are expressed using arithmetical-logical syntax.

12. The logic of claim 10, wherein a library of atomic entities or events is automatically generated to compose expressions.

13. The logic of claim 10, wherein a set of light-weight, pre-coded, automatically-configurable checkers are employed in capturing the requirements or properties, the set being a subset of the set of checkers for capturing all possible requirements or properties.

14. The logic of claim 10, wherein the logic is used with both formal and semi-formal techniques.

15. The logic of claim 10, wherein the logic can use any or all of model checking, symbolic execution, testing, and runtime checking.

16. The logic of claim 10, wherein the logic uses a requirements entry UI that includes requirements language and a library of requirement templates.

17. The logic of claim 10, wherein the requirements validation middleware is coupled to a software validation tool and a library of templatized property monitors.

18. The logic of claim 10, wherein the requirements validation middleware is part of a web application validation toolkit.

19. A system, comprising:
a processor;
requirement validation middleware, executed by the processor;
a software validation tool, executed by the processor; and
a library of templatized property monitors, wherein the requirements validation middleware is coupled to the software validation tool and the library of templatized property monitors, the middleware capturing requirements or properties for one or more web applications, wherein:
template-based formalism is employed to capture the one or more requirements or properties of the operation of the web applications;
the template-based formalism includes formal expression of the requirements or properties in relationship with the occurrence of events associated with the web applications; and
a set of relevant temporal patterns is provided from which the middleware chooses in capturing the requirements or properties, the set being a subset of the set of possible requirements or properties, the set of relevant temporal patterns used in conjunction with the template-based formalism for the formal expression of the requirements or properties in relationship with the occurrence of events associated with the web applications.

20. The system of claim 19, wherein requirements and properties are expressed using arithmetical-logical syntax.

21. The system of claim 19, wherein a library of atomic entities or events is automatically generated to compose expressions.

22. The system of claim 19, wherein a set of light-weight, pre-coded, automatically-configurable checkers are employed in capturing the requirements or properties, the set being a subset of the set of checkers for capturing all possible requirements or properties.

23. The system of claim 19, wherein the system is used with both formal and semi-formal techniques.

24. The system of claim 19, wherein the method uses any or all of model checking, symbolic execution, testing, and runtime checking.

25. The system of claim 19, wherein the temporal patterns include a global safety event, wherein the global safety event may happen at any time during an execution trace of the web application.

26. The system of claim 19, wherein the temporal patterns include an eventual response event and a defined previous event, wherein the eventual response event happens at any time after a defined previous event during an execution trace of the web application.

27. The system of claim 19, wherein the temporal patterns include an immediate response event and a defined previous event, wherein, during an execution trace of the web application, the eventual response event happens immediately after the defined previous event and before any other event.

28. The system of claim 19, wherein the temporal patterns include a precedence event and a defined later event, wherein given the defined later event the precedence event happens previously during an execution trace of the web application.

* * * * *